United States Patent [19]
Bier et al.

[11] Patent Number: 5,315,869
[45] Date of Patent: May 31, 1994

[54] GAS METER ASSEMBLY

[75] Inventors: Joseph Bier, Warren; Richard Fox, Cliffside Park, both of N.J.

[73] Assignee: Richards Manufacturing Company, Sales Inc., Irvington, N.J.

[21] Appl. No.: 848,859

[22] Filed: Mar. 10, 1992

[51] Int. Cl.$^5$ ............................................. G01F 15/18
[52] U.S. Cl. ....................................... 73/201; 285/30
[58] Field of Search ...................... 73/201, 273; 285/30

[56] References Cited

U.S. PATENT DOCUMENTS

| | | | |
|---|---|---|---|
| 1,355,678 | 10/1920 | Tarte | 285/30 |
| 1,840,046 | 1/1932 | McKee | 285/30 |
| 1,926,752 | 9/1933 | Mueller et al. | 285/30 |
| 2,055,700 | 9/1936 | Olsen | 285/30 |
| 2,241,485 | 5/1941 | Sellers | 285/30 |
| 2,690,077 | 9/1954 | Lisenbee | 73/201 |
| 3,444,724 | 5/1969 | Gilpin | 73/201 |

Primary Examiner—Herbert Goldstein
Attorney, Agent, or Firm—Richard T. Laughlin

[57] ABSTRACT

A gas meter assembly having a universal type connector subassembly. This gas meter assembly includes a gas meter, inlet piping, outlet piping, and a connector unit which has a U-shaped inlet pipe, a Z-shaped outlet pipe, and a strut fixedly connected to the U-shaped inlet pipe and connected to the Z-shaped outlet pipe. The strut has a first hole with a first axis receiving the inlet pipe and has a second hole with a second axis receiving an upper portion of the Z-shaped outlet pipe for rotating through a selective angle a lower portion of the Z-shaped outlet pipe with a third axis, so that the spacing between the first and third axes can be made either more or less than the spacing between the first and second axis, in order to match the spacing between inlet and outlet connections of the meter.

4 Claims, 2 Drawing Sheets

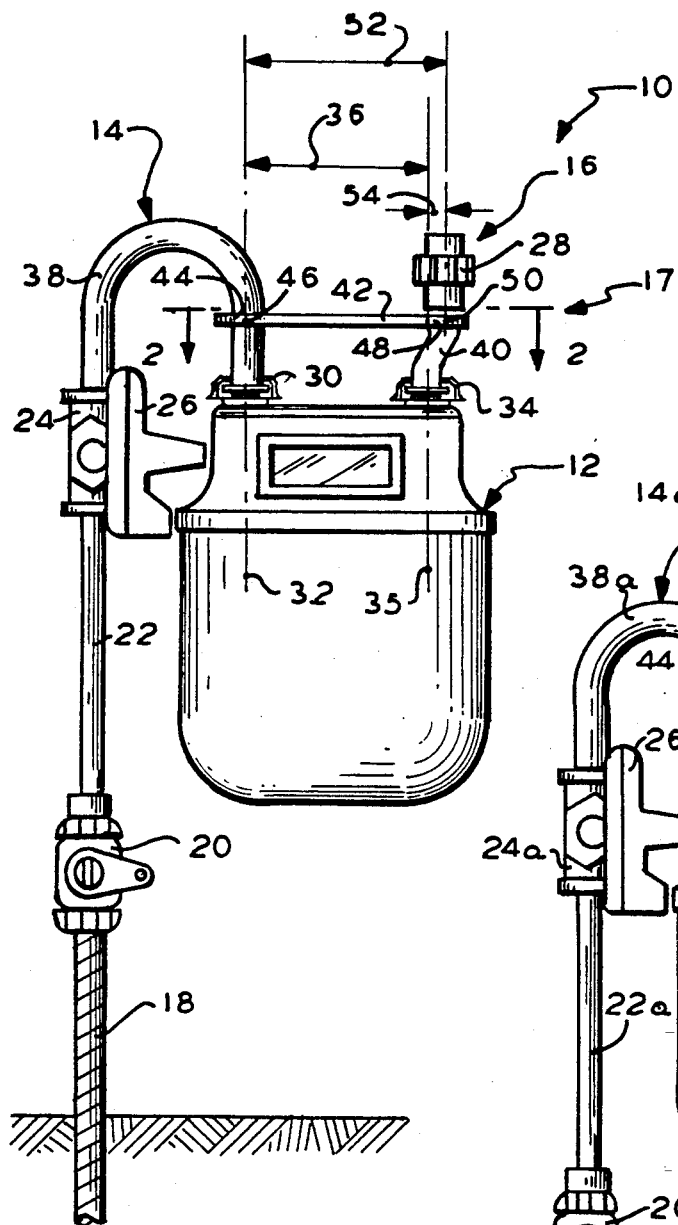
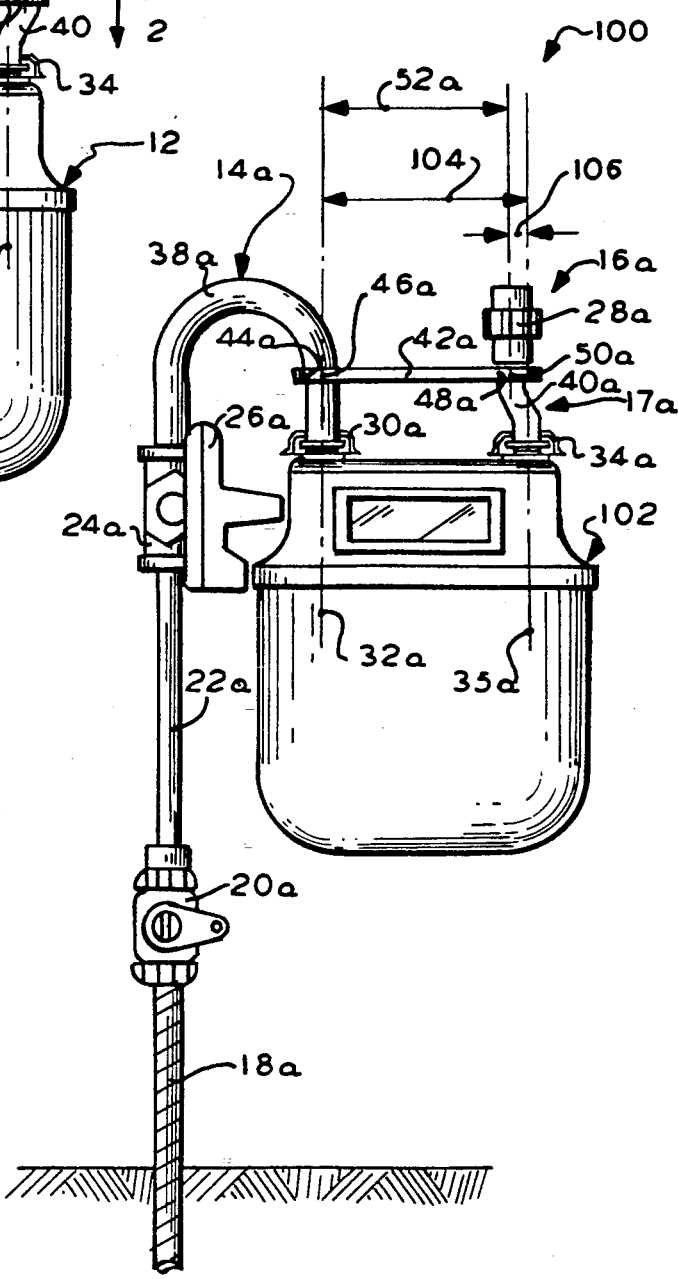

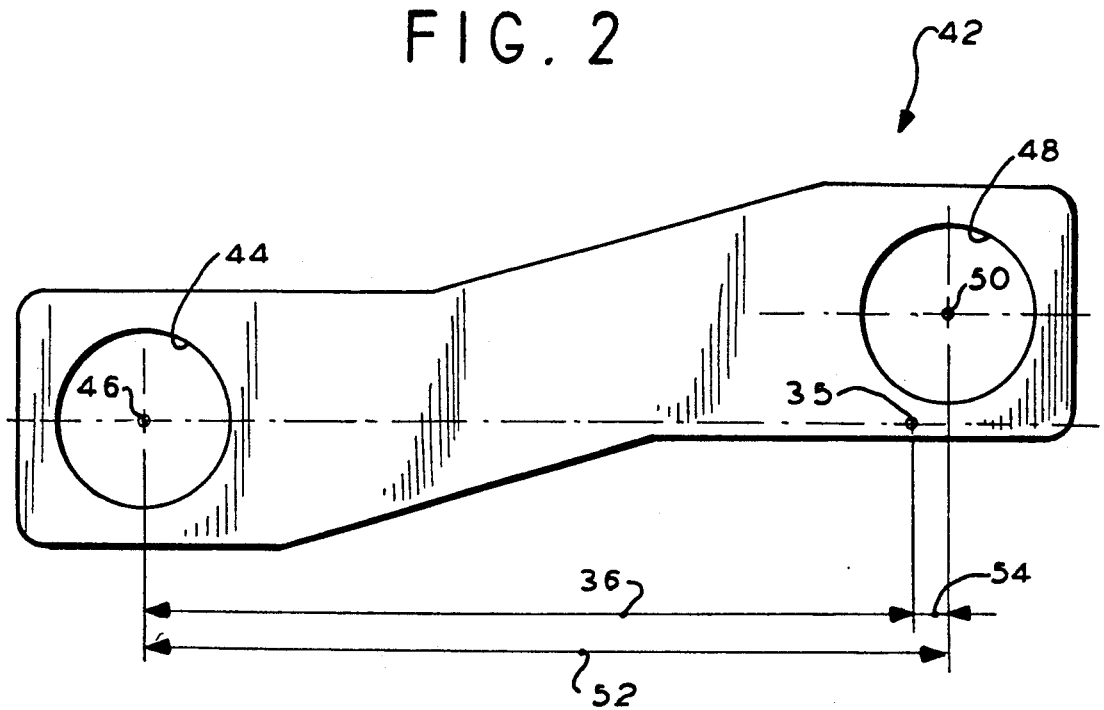

GAS METER ASSEMBLY

The invention relates to a gas meter assembly, and in particular the invention relates to a gas meter assembly having a connector having an inlet pipe and an outlet pipe with an adjustable spacing there between.

BACKGROUND OF THE INVENTION

The prior art gas meter connector has an inlet pipe and an outlet pipe with a fixed spacing therebetween.

One problem with the prior art gas meter connector is that a replacement gas meter may have a different spacing between axes of its inlet and outlet connections than the fixed spacing between the axes of the connector inlet and outlet pipes.

SUMMARY OF THE INVENTION

According to the present invention, a meter assembly is provided. This assembly comprises a meter having inlet and outlet connections, an inlet means, an outlet means, and connector means, said connector means having an inlet pipe and an adjustable Z-shaped outlet pipe and a strict, said strict having a first hole with an exit for the inlet pipe and having a second hole with an axis for the Z-shaped outlet pipe, said Z-shaped outlet pipe being adjustable about its axis for adjusting a spacing between axes of the inlet pipe and the outlet pipe to match a spacing between axes of the inlet and outlet connections of the meter.

By using the adjustable Z-shaped pipe for adjusting the spacing between the connector inlet pipe and connector outlet pipe to match the spacing between the inlet connection and the outlet connection of the meter, a universal-type of connector is provided to suit a new replacement gas meter, which has a different spacing between its connections then the spacing between connections of the old meter.

The foregoing and other objects, features and advantages will be apparent from the following description of the preferred embodiment of the invention as illustrated in the accompanying drawings.

BRIEF DESCRIPTION OF THE DRAWINGS

FIG. 1 is an elevation view of a gas meter assembly according to the present invention;

FIG. 2 is a section view as taken along the line 2—2 of FIG. 1; and

FIG. 3 is an elevation view of a second embodiment of a gas meter assembly.

DESCRIPTION OF THE PREFERRED EMBODIMENT

As shown in FIGS. 1 and 2, a gas meter assembly 10 is provided. Assembly 10 has a gas meter unit 12, and inlet means 14, an outlet means 16 and a connector subassembly 17. Inlet means 14 has a gas supply line 18, which connects to a shut off valve 20 that connects to a connecting pipe 22. Inlet means 14 also has a threaded joint 24 and a support unit 26. Outlet means 16 has a threaded joint 28 for an outlet line.

Meter 12 has an inlet swivel connection 30, which has an axis 32, and has an outlet swivel connection 34, which has an axis 35. Axes 32, 35 have therebetween a projected spacing 36.

Connector 17 has a U-shaped inlet pipe 38, a Z-shaped outlet pipe 40, and a strut or bar or brace 42. As shown in FIG. 2, bar 42 has a first hole 44 with an axis 46, and has a second hole 48 with an axis 50. Bar hole axes 46, 50 are separated by a spacing 52. In this embodiment, are hole spacing 52 is 6 7/16 inches in length, which is midway between the usual minimum spacing of 6 inches and maximum spacing of 6⅞ inches. Swivel connection axis 35 is offset to the left of axis 50 of hole 48 by a left offset distance 54. Axis 46 and axis 32 are coaxial. Swivel connection spacing 36 is 6 inches, which is a visual minimum spacing. In this embodiment, hole 44 is a 1.000 inch diameter hole and is tapped from the bottom thereof. Hole 48 is 1.400 inches in diameter. Bar 42 is one-quarter inch in thickness.

As shown in FIG. 3, a second embodiment or assembly 100 is provided Assembly 100 has a gas meter unit 102, an inlet means 14a, an outlet means 16a, and a connector, subassembly 17a. Inlet means 14a has a gas supply lime 18a, which connects to a shutoff valve 20a that connects to a connecting pipe 22a. Inlet means 14a also has a threaded joint 24a and a support unit 26a. Outlet means 16a has a threaded joint 28a for an outlet line.

Meter 102 has an inlet swivel connection 30a which has an axis 32a, and has an outlet swivel connection 34a which has an axis 35a. Axes 32a, 35a have a projected spacing 104.

connector 17a has a U-shaped inlet pipe 38a, a Z-shaped outlet pipe 40a, and a strut or bar 42a. Bar 42a has a first hole 44a with an axis 46a, and has a second hole 48a with an axis 50a. Bar hole axes 46a, 50a are separated by a spacing 52a. In this embodiment, bar hole spacing 52a is 6 7/16 inches in length. Swivel connection axis 35a is offset to the right of axis 50a of hole 48a by a right offset distance 106. Axes 46a and 32a are coaxial. Swivel connection spacing 104 is 6⅞ inches, which is a usual maximum spacing. Tapped hole 44a is 1.000 inches diameter. Hole 48a is 1.400 inches diameter. Bar 42a is one-quarter inch in thickness.

Advantages of assembly 10 and assembly 100 are indicated hereafter.

A) Connector 17, 17a is a universal type of connector which can be fitted to any meter swivel connection spacing in the usual range of 6 inches to 6⅞ inches.

B) Connector 17, 17a can be shipped with a new replacement gas meter for connection to existing piping.

C) Connector 17, 17a avoids the need for a custom-made connector for a replacement gas meter.

D) Connector 17, 17a can be made of conventional metal or like material.

While the invention has been described in its preferred embodiment, it is to be understood that the words which have been used are words of description rather than limitation and that changes may be made within the purview of the appended claims without departing from the true scope and spirit of the invention in its broader aspects.

For example, the Z-shaped outlet pipe 40 can be made of a malleable metal for slight adjustment of the distance between the top portion axis 50 and the bottom portion axis 35.

What is claimed is:

1. A gas meter assembly comprising: a gas meter having inlet and outlet connections, an inlet means, an outlet means, and connector means, said connector means having a U-shaped inlet pipe, a Z-shaped outlet pipe and a strut, said strut having a first hole with a first axis receiving the inlet pipe and having a second hole with a second axis receiving the outlet pipe, said Z-shaped outlet pipe having a first end portion rotatably adjustable about the second axis relative to the strut for rotatably adjusting a third axis of a second end portion about the second axis for adjusting the spacing between the first axis and the third axis to match a spacing between the meter inlet and outlet connections, wherein the strut first hole is a tapped hole for forming a fixed connection to the U-shaped inlet pipe, and the strut second hole is an oversize hole for ease of rotation of the outlet pipe about the second hole axis relative to the strut, wherein the strut is shaped as formed from a first straight section, a second straight section and a third straight section, wherein the first straight section defines a first longitudinal direction, wherein the second section is connected to the first section and disposed at an angle relative to the first section, and wherein the third section is connected to the second section at an angle and is disposed substantially parallel to the first section.

2. The assembly of claim 1, wherein
the inlet means has a gas supply line, and a shutoff valve connecting to the gas supply line, and an elongate pipe connecting to the shutoff valve and a pipe joint connecting to the elongate pipe and to the U-shaped inlet pipe, and wherein
the outlet means has a pipe joint connecting to the first end portion of the Z-shaped pipe for connection to a metered gas line.

3. The assembly of claim 1 wherein the spacing between the first axis and the third axis is less than the spacing between the first axis and the second axis.

4. The assembly of claim 1, wherein the spacing between the first axis and the third axis is greater than the spacing between the first axis and the second axis.

* * * * *